US011873255B2

(12) United States Patent
Iguchi et al.

(10) Patent No.: US 11,873,255 B2
(45) Date of Patent: Jan. 16, 2024

(54) DIELECTRIC COMPOSITION AND ELECTRONIC COMPONENT

(71) Applicant: TDK CORPORATION, Tokyo (JP)

(72) Inventors: Toshihiro Iguchi, Tokyo (JP); Tetsuhiro Takahashi, Tokyo (JP); Hiroki Akiba, Tokyo (JP); Ryota Nomura, Tokyo (JP)

(73) Assignee: TDK CORPORATION, Tokyo (JP)

( * ) Notice: Subject to any disclaimer, the term of this patent is extended or adjusted under 35 U.S.C. 154(b) by 176 days.

(21) Appl. No.: 17/558,077

(22) Filed: Dec. 21, 2021

(65) Prior Publication Data

US 2022/0227673 A1 Jul. 21, 2022

(30) Foreign Application Priority Data

Jan. 20, 2021 (JP) .................................. 2021-007208

(51) Int. Cl.
*C04B 35/495* (2006.01)
*H01G 4/12* (2006.01)

(52) U.S. Cl.
CPC ......... *C04B 35/495* (2013.01); *H01G 4/1254* (2013.01); *C04B 2235/765* (2013.01)

(58) Field of Classification Search
CPC .................................................. C04B 35/495
See application file for complete search history.

(56) References Cited

U.S. PATENT DOCUMENTS

| 2018/0282229 | A1 | 10/2018 | Yamazaki et al. |
| 2022/0230776 | A1* | 7/2022 | Iguchi ................. H01G 4/1254 |
| 2023/0085744 | A1* | 3/2023 | Takahashi ............ H01G 4/1227 |
| | | | 501/135 |

FOREIGN PATENT DOCUMENTS

| CN | 108138307 A | 6/2018 |
| JP | 2000-103671 A | 4/2000 |

OTHER PUBLICATIONS

Han et al "Cubic Dielectrics for Superconducting Electronics. In situ Growth of Epitaxial Sr2AlTaO6 Thin Films Using Metalorganic Chemical Vapor Deposition." Chem. Mater. vol. 6, No. 1, pp. 18-20. (Year: 1994).*

* cited by examiner

*Primary Examiner* — Karl E Group
(74) *Attorney, Agent, or Firm* — Oliff PLC

(57) ABSTRACT

In order to provide a dielectric composition having high density even when fired at a relatively low temperature, the main component of a dielectric composition includes tantalum and at least one of barium or strontium, and the subcomponent of the dielectric composition includes at least one element selected from the group consisting of vanadium, titanium, and aluminum.

9 Claims, 3 Drawing Sheets

DIELECTRIC COMPOSITION AND ELECTRONIC COMPONENT

BACKGROUND OF THE INVENTION

The present invention relates to a dielectric composition and an electronic component.

A dielectric composition that has high relative permittivity without including lead, an alkali metal, and the like has been developed, as shown in Patent Literature 1.

However, such newly developed dielectric composition needs to be fired at a high temperature to become a high-density dielectric.

PRIOR ARTS

Patent Literature

Patent Literature 1: Japanese Unexamined Patent Application Publication No. 2000-103671

BRIEF SUMMARY OF THE INVENTION

The present invention has been achieved under such circumstances. It is an object of the invention to provide a dielectric composition that would have high density even when fired at a relatively low temperature.

The main component of the dielectric composition according to the present invention includes tantalum and at least one of barium or strontium. The subcomponent of the dielectric composition according to the present invention includes at least one element selected from the group consisting of vanadium, titanium, and aluminum.

The dielectric composition according to the present invention can achieve high density and high relative permittivity even when fired at a relatively low temperature.

The dielectric composition according to the present invention preferably and substantially does not include niobium, an alkali metal, and lead.

Some dielectric compositions with high relative permittivity are $(Sr,Ba)Nb_2O_6$ whose main component is niobium (Nb), $(Na,K)NbO_3$ including an alkali metal, and $Pb(Zr,Ti)O_3$ including lead (Pb).

Substantially excluding niobium, the dielectric composition according to the present invention is less likely to have oxygen vacancy defects. This means that changes in the valence of element constituting dielectric composition is controlled. The valence of element constituting dielectric composition is less likely to change when reduction firing is performed in order to fire the dielectric composition together with a base metal. Consequently, reduction of the resistivity of the dielectric composition seems to be prevented to enable high resistivity at a wide range of temperatures, and the dielectric loss of the dielectric composition seems to be lowered.

Because the dielectric composition according to the present invention substantially excludes an alkali metal, composition deviation of the dielectric composition and dirt on a furnace due to alkali metal evaporation can be prevented.

The dielectric composition according to the present invention substantially excludes lead, whose use is controlled by Restriction of Hazardous Substances Directive (RoHS).

The main component preferably includes strontium.

The main component preferably includes barium and strontium.

A total amount of vanadium, titanium, and aluminum is preferably 0.5-10 parts by mass in terms of the conversion ratio of the oxide of each element, with respect to 100 parts by mass of the entire amount of the dielectric composition, while the valence of vanadium is 5, the valence of titanium is 4, and the valence of aluminum is 3.

The main component is preferably expressed by $\{Ba_xSr_{(1-x)}\}Ta_4O_{12}$, and the value of x is preferably 0.75 or smaller. This enables higher density and resistivity as well as lower dielectric loss corresponding to the increase of the relative permittivity.

The value of x is more preferably 0.1-0.75 (both inclusive, the same applies hereafter), which enables still higher relative permittivity.

The value of m is preferably 1.9-2.1, which enables still higher density and resistivity as well as still lower dielectric loss corresponding to the increase of the relative permittivity.

The crystal system of the crystal of the main component is preferably tetragonal.

An electronic component according to the present invention comprises the dielectric composition.

BRIEF DESCRIPTION OF THE DRAWING(S)

DETAILED DESCRIPTION OF THE INVENTION

<Multilayer Ceramic Capacitor>

Figure 1:
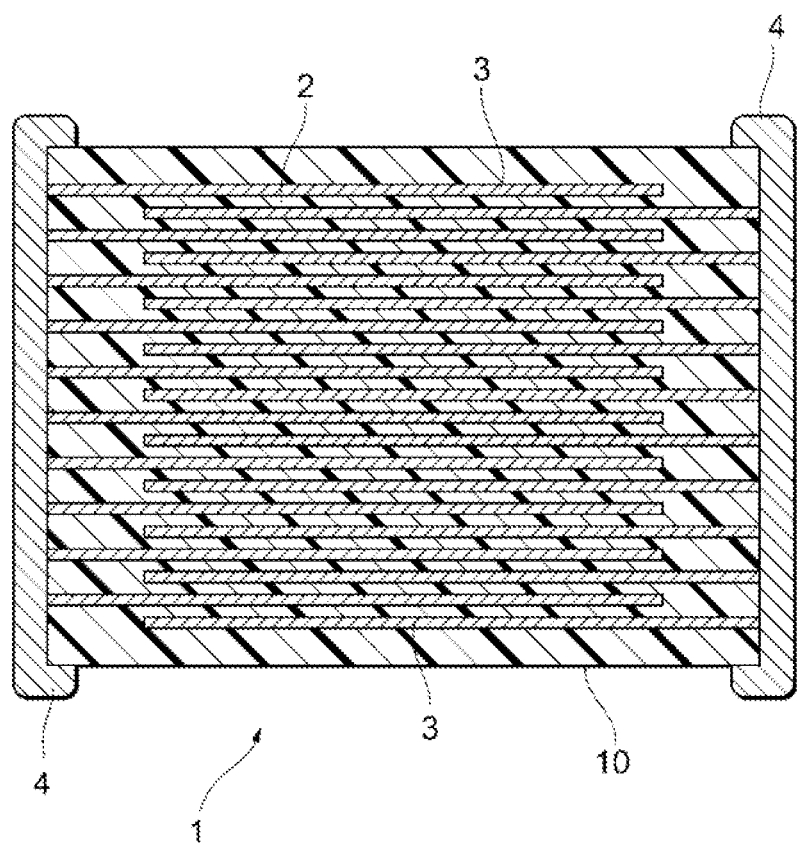
FIG. 1 is a schematic cross-sectional view of a multilayer ceramic capacitor according to an embodiment of the present invention.

FIG. 1 shows a multilayer ceramic capacitor 1, an example of an electronic component according to the present embodiment. The multilayer ceramic capacitor 1 includes an element body 10 having dielectric layers 2 and internal electrode layers 3 stacked alternately. A pair of external electrodes 4 is formed on both ends of the element body 10 and electrically connects with the internal electrode layers 3 alternately arranged inside the element body 10. The element body 10 may have any shape, but normally has a rectangular parallelepiped shape. The dimensions of the element body 10 are not limited and are appropriately determined based on usage.

<Dielectric Layers>

The dielectric layers 2 are composed of a dielectric composition according to the present embodiment mentioned below.

The thickness of the dielectric layers 2 per one layer (inter-layers thickness) is not limited and is determined freely based on desired characteristics, usage, etc. The inter-layers thickness is normally preferably 30 μm or less, more preferably 15 μm or less, and still more preferably 10 μm or less.

<Internal Electrode Layers>

In the present embodiment, the internal electrode layers 3 are stacked so that their ends are alternately exposed to the two end surfaces of the element body 10 facing each other.

The internal electrode layers 3 may contain any conductive material. Some noble metals that may be used as the conductive material are palladium (Pd), platinum (Pt), and silver-palladium (Ag—Pd) alloy. Some base metals that may be used as the conductive material are nickel (Ni), nickel based alloy, copper (Cu), and copper based alloy. A maximum of about 0.1 mass % of various fine components, such as phosphorus (P) and/or sulfur (S), may be contained in nickel, nickel based alloy, copper, or copper based alloy. The internal electrode layers 3 may be formed using a commercially available electrode paste. The thickness of the internal electrode layers 3 is determined appropriately based on usage or so.

<External Electrodes>

The external electrodes 4 may contain any conductive material. For example, the external electrodes 4 may contain a known conductive material, such as nickel, copper, tin (Sn), silver, palladium, platinum, gold (Au), their alloy, and conductive resin. The thickness of the external electrodes 4 is determined appropriately based on usage or so.

<Dielectric Composition>

The main component of the dielectric composition constituting the dielectric layers 2 according to the present embodiment includes tantalum (Ta) and at least one of barium (Ba) and strontium (Sr).

The main component of the dielectric composition according to the present embodiment preferably includes strontium, and more preferably includes both strontium and barium.

The main component of the dielectric composition according to the present embodiment may be expressed by $\{Ba_xSr_{(1-x)}\}_mTa_4O_{12}$ for example.

The value of x is preferably 0.75 or smaller, and more preferably 0.1-0.75 (both inclusive, the same applies hereafter).

The value of m is preferably 1.8-2.2, and more preferably 1.9-2.1.

A crystal system of a crystal of the main component of the dielectric composition according to the present embodiment is not limited, but is preferably tetragonal or orthorhombic, and more preferably tetragonal.

The elements excluding oxygen constituting the main component is defined as, for example, a component that occupies 80-100 parts by mol, more preferably 90-100 parts by mol, with respect to 100 parts by mol of elements other than oxygen contained in the dielectric composition.

The dielectric composition according to the present embodiment substantially excludes niobium (Nb), alkali metals, and lead (Pb). This means that a total of niobium, alkali metals, and lead occupies 10 parts by mol or less, preferably 5 parts by mol or less, with respect to 100 parts by mol of the elements other than oxygen contained in the dielectric composition.

The subcomponent of the dielectric composition according to the present embodiment includes at least one element selected from the group consisting of vanadium (V), titanium (Ti), and aluminum (Al), and preferably includes aluminum (Al).

With respect to 100 parts by mass of the entire amount of the dielectric composition, a total amount of vanadium, titanium, and aluminum is preferably 0.5-10 parts by mass, and more preferably 1-5 parts by mass, in terms of the conversion ratio of the oxide of each element, whose valence is 5 for vanadium, 4 for titanium, and 3 for aluminum.

The dielectric composition according to the present embodiment may include, for example, elements such as magnesium (Mg), silicon (Si), calcium (Ca), manganese (Mn), chromium (Cr), and rare-earth elements, other than the main component and the subcomponent.

<Method of Manufacturing Multilayer Ceramic Capacitor>

Next, a method of manufacturing the multilayer ceramic capacitor 1 shown in FIG. 1 is explained below.

In the present embodiment, powders of the main component and the subcomponent constituting the dielectric composition are prepared. Methods of manufacturing the powder of the main component are not limited. One such method may be the solid-phase reaction method, including calcining. Raw materials of the elements constituting the powders of the main component and the subcomponent are not limited, and oxides of the above-mentioned elements may be used. Various compounds used to obtain oxides of each element by firing may also be used.

The raw materials of the powders of the main component and the subcomponent are weighed to a predetermined ratio and are thereafter mixed in wet manner for a predetermined time using a ball mill or so. The mixed powder is dried and thereafter heated at 700-1300° C. in the air to obtain the calcined powder of the main component and the subcomponent. The calcined powder may be pulverized for a predetermined time using a ball mill or so.

Then, a paste for manufacturing green chips is prepared. The calcined powder of the main component and the subcomponent, a binder, and a solvent are kneaded and turned into paint to obtain a paste for dielectric layers. The binder and the solvent are known ones.

If necessary, the paste for dielectric layers may include additives, such as plasticizers and dispersants.

A paste for internal electrode layers is obtained by kneading the above-mentioned raw material of the conductive material, a binder, and a solvent. The binder and the solvent are known ones. If necessary, the paste for internal electrode layers may include additives, such as sintering inhibitors and plasticizers.

A paste for external electrodes can be prepared in a similar manner as the paste for internal electrode layers is prepared.

Green sheets and internal electrode patterns are formed using the obtained pastes and are stacked to obtain green chips.

If necessary, the green chips are subjected to a binder removal treatment. As conditions of the binder removal treatment, for example, the holding temperature is preferably 200-350° C.

After the binder removal treatment, the green chips are fired to obtain the element bodies 10. In the present embodiment, the atmosphere of the firing is not limited and may be the air or a reduction atmosphere. In the present embodiment, the holding temperature of the firing is not limited and is, for example, 1300-1455° C.

After the firing, if necessary, the element body 10 is subjected to a reoxidation treatment (annealing). As conditions of the annealing, the oxygen partial pressure of the annealing is preferably higher than that of the firing, and the holding temperature is preferably 1150° C. or lower.

A dielectric composition constituting the dielectric layers 2 of the element body 10 obtained in the above-mentioned manner is comprised of the above-mentioned dielectric composition. The end surfaces of the element body 10 are polished, applied with the paste for external electrodes, and baked to form the external electrodes 4. Then, if necessary, a coverage layer is formed on the surfaces of the external electrodes 4 by plating or so.

The multilayer ceramic capacitor 1 according to the present embodiment is thus manufactured.

Including at least one element selected from the group consisting of vanadium, titanium, and aluminum in the present embodiment enables the dielectric composition to achieve high density even when fired and sintered at a relatively low temperature.

Including tantalum and at least one of barium or strontium in the main component enables the dielectric composition according to the present embodiment to have constant and high relative permittivity at a wide range of temperatures. Specifically, a relative permittivity of at least 65 can be observed at a temperature of −55 to +150° C., and a relative permittivity of at least 60 can be observed at a temperature of −70 to +180° C., in accordance with the composition of the present embodiment.

The dielectric composition according to the present embodiment enables a capacitance change to be within ±22% of the capacitance at 25° C. under a temperature range of −55 to +150° C., thus satisfying the X8S standard. The dielectric composition according to the present embodiment also enables a capacitance change to be within ±22% of the capacitance at 25° C. under a temperature range of −70 to +180° C.

The dielectric composition of the present embodiment enables its high density, high relative permittivity, low dielectric loss, and high resistivity, without substantially including niobium, alkali metals, and lead.

The dielectric composition according to the present embodiment, which includes tantalum and substantially excludes niobium, tends to have higher relative permittivity, lower dielectric loss, and higher resistivity compared to a conventional dielectric composition, which excludes tantalum and includes niobium. This may be because tantalum pentoxide ($Ta_2O_5$) is less likely to have oxygen vacancy defects compared to niobium pentoxide ($Nb_2O_5$).

Dielectric properties being unique to an insulator, the dielectric composition needs to have high resistivity so as not to become a semiconductor or a conductor. As mentioned above, tantalum pentoxide ($Ta_2O_5$) is less likely to have oxygen vacancy defects compared to niobium pentoxide ($Nb_2O_5$). This means that changes in the valence of tantalum pentoxide are controlled. Consequently, reduction of the resistivity of the dielectric composition seems to be prevented to enable high resistivity at a wide range of temperatures, and the dielectric loss of the dielectric composition seems to be lowered.

Although the embodiment according to the present invention has been explained above, the present invention is not at all limited to this embodiment. The present invention may be put into practice in various forms without departing from the scope of the invention.

Although the above embodiment explains the case where an electronic component according to the present invention is a multilayer ceramic capacitor, an electronic component according to the present invention is not limited to a multilayer ceramic capacitor, and may be any other electronic component having the above-mentioned dielectric composition.

For example, an electronic component according to the present invention may be a single plate ceramic capacitor having a pair of electrodes formed on a single layer dielectric substrate comprised of the above-mentioned dielectric composition.

An electronic component according to the present invention may be a filter, a diplexer, a resonator, a vibrator, or an antenna, as well as a capacitor.

EXAMPLES

Hereinafter, the present invention is explained in further detail with examples and comparative examples, but is not limited to the following examples.

[Experiment 1]

<Samples 1-15 and 21-25>

Powders of $BaCO_3$, $SrCO_3$, and $Ta_2O_5$ were prepared as the starting raw materials of the main component of each dielectric composition. The starting raw materials (powders) were weighed so that the main component after firing would have the composition shown in Table 1 or 2.

The starting raw material (powder) of the subcomponent of each dielectric composition shown in Tables 1 and 2 was prepared and then weighed so that the amount of the subcomponent after firing would be as shown in Table 1 or 2. For sample 15, $CaCO_3$ was prepared instead of CaO. "The amount of the subcomponent" means the amount of the element constituting the subcomponent in terms of the conversion ratio of the oxide of the element with respect to 100 parts by mass of the entire amount of the dielectric composition. In the conversion, the valence of aluminum was 3, the valence of titanium was 4, the valence of vanadium was 5, and the valence of magnesium was 2, the valence of silicon was 4, and the valence of calcium was 2.

Next, the weighed powders were mixed in wet manner in a ball mill using ion-exchanged water as dispersion medium, and this mixture was dried to obtain a mixed raw material powder. After that, the mixed raw material powder was heated at 900° C. (holding temperature) for two hours (holding time) in the air to obtain the calcined powder of the main component and the subcomponent.

The calcined powder of the main component and the subcomponent was pulverized in wet manner in a ball mill using ion-exchanged water as dispersion medium, and this mixture was dried to obtain the dielectric raw material.

10 parts by mass of water solution including 6 parts by mass of polyvinyl alcohol resin were added to 100 parts by mass of the dielectric raw material to obtain a granulated powder.

The granulated powder was put into a mold with an inner diameter of Φ 12 mm, temporarily press-molded with a pressure of 0.6 ton/cm$^2$, and press-molded with a pressure of 1.2 ton/cm$^2$ to obtain a disc-shaped green body.

The green body was subjected to a binder removal treatment, fired, and annealed under the following conditions to obtain an element body.

As the conditions of the binder removal treatment, the holding temperature was 400° C., the temperature holding time was two hours, and the atmosphere was the air.

As the firing conditions, the holding temperature was 1400° C., the holding time was two hours, and the atmosphere was a humidified $N_2+H_2$ mixed gas (the oxygen partial pressure was $10^{-12}$ MPa). A wetter was used for humidification of the atmosphere gas upon firing.

As the annealing conditions, the holding temperature was 1050° C., the temperature holding time was two hours, and the atmosphere gas was a humidified $N_2$ gas (the oxygen partial pressure was $10^{-7}$ MPa). A wetter was used for humidification of the atmosphere gas upon annealing.

The density and the relative permittivity of the sintered body (dielectric composition) were measured using the following methods. For the measurement of the relative permittivity, an indium (In)-gallium (Ga) electrode paste was applied to the dielectric composition (sintered body) to obtain a disc-shaped ceramic capacitor sample (capacitor sample).

<Density>

The density of the dielectric composition was measured as follows. The volume "V" of the dielectric composition was first calculated. The mass "m" of the disc-shaped dielectric composition was then measured. The density of the dielectric composition was finally calculated by dividing "m" by "V" (m/V). The results are shown in Tables 1 and 2.

Figure 2:
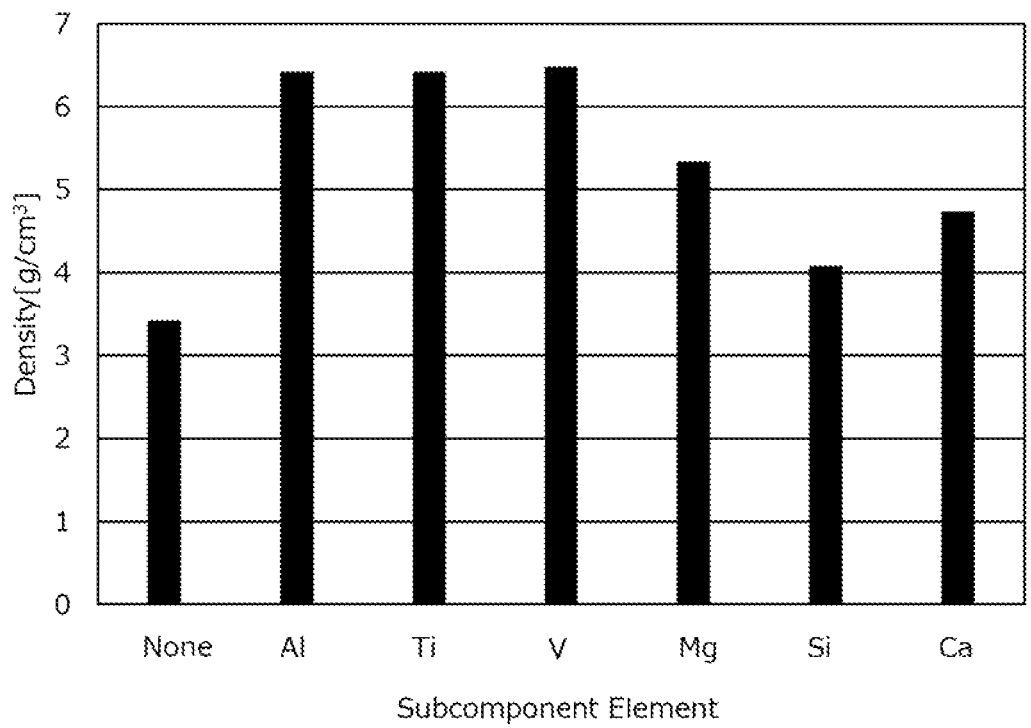
FIG. 2 is a chart showing the relationship between the types of subcomponents and the density of dielectric compositions.

FIG. 2 shows the density of each subcomponent when the main component is $BaSrTa_4O_{12}$ (samples 5-8, 13-15). $BaSrTa_4O_{12}$ has the same composition as $(Ba_{0.5}Sr_{0.5})_2Ta_4O_{12}$. The composition of $BaSrTa_4O_{12}$ has a value of 0.5 for x and the value of 2 for m in the general formula of $\{Ba_xSr_{(1-x)}\}_mTa_4O_{12}$.

<Relative Permittivity>

A signal with a frequency of 1 kHz and an input signal level (measurement voltage) of 1 Vrms was applied to the capacitor sample using a digital LCR meter (4284A manufactured by YHP) at a room temperature (20° C.) to measure the capacitance "C". Then, the relative permittivity was calculated using the thickness of the sintered body, the effective electrode area, and the measured capacitance "C". The results are shown in Tables 1 and 2.

Figure 3:
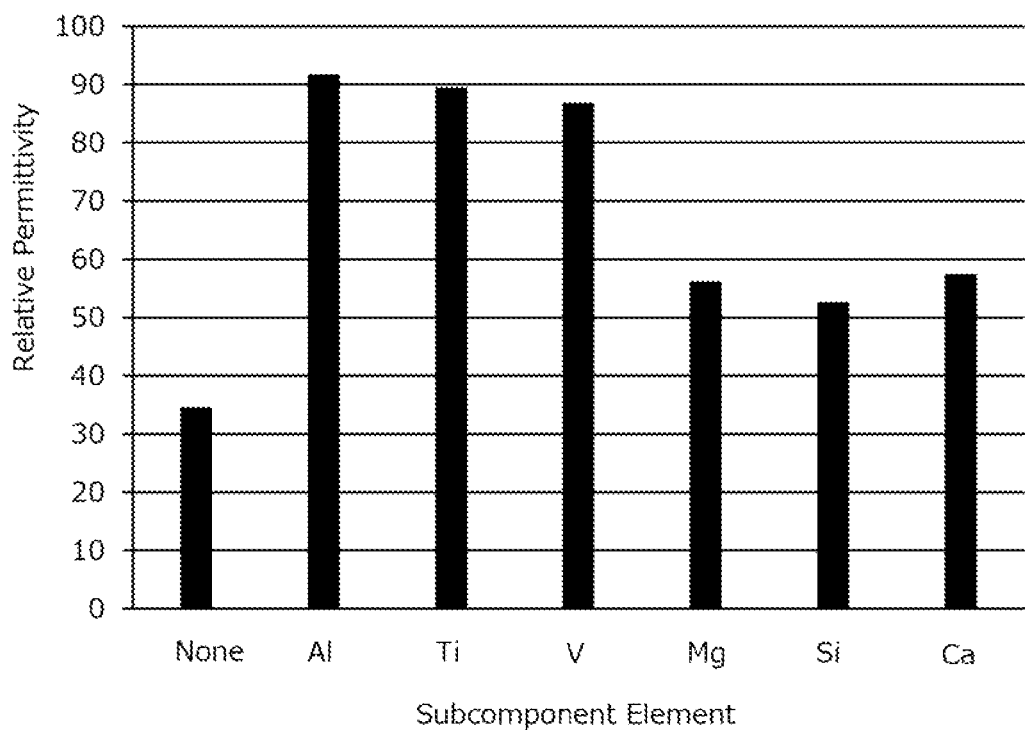
FIG. 3 is a chart showing the relationship between the types of subcomponents and the relative permittivity of dielectric compositions.

FIG. 3 shows the relative permittivity of each subcomponent when the main component is $BaSrTa_4O_{12}$ (samples 5-8, 13-15).

Figure 4:
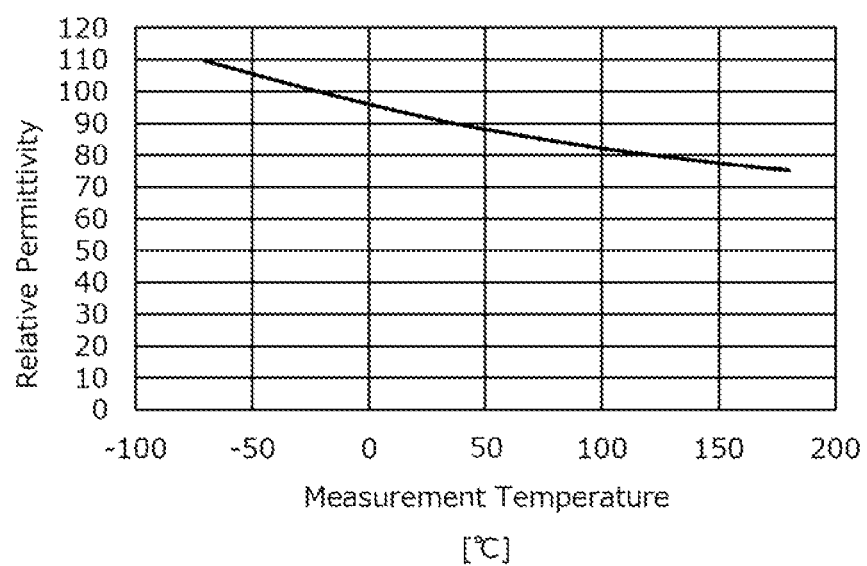
FIG. 4 is a chart showing the relationship between measurement temperatures and the relative permittivity of sample 6.

The relative permittivity of sample 6 was measured between −70 to +180° C. at 10° C. intervals. The results are shown in FIG. 4.

TABLE 1

| Sample | Main component | Subcomponent Element | Amount in terms of the conversion ratio of the oxide of the element [Parts by mass] | Density [g/cm³] | Relative Permittivity |
|---|---|---|---|---|---|
| 1 | $Ba_2Ta_4O_{12}$ | None | | 3.21 | 31 |
| 2 | $Ba_2Ta_4O_{12}$ | Al | 3 | 6.01 | 81 |
| 3 | $Ba_2Ta_4O_{12}$ | Ti | 3 | 6.02 | 81 |
| 4 | $Ba_2Ta_4O_{12}$ | V | 3 | 6.02 | 82 |
| 5 | $BaSrTa_4O_{12}$ | None | | 3.42 | 35 |
| 6 | $BaSrTa_4O_{12}$ | Al | 3 | 6.42 | 92 |
| 7 | $BaSrTa_4O_{12}$ | Ti | 3 | 6.42 | 89 |
| 8 | $BaSrTa_4O_{12}$ | V | 3 | 6.48 | 87 |
| 9 | $Sr_2Ta_4O_{12}$ | None | | 3.87 | 44 |
| 10 | $Sr_2Ta_4O_{12}$ | Al | 3 | 6.46 | 90 |
| 11 | $Sr_2Ta_4O_{12}$ | Ti | 3 | 6.49 | 93 |
| 12 | $Sr_2Ta_4O_{12}$ | V | 3 | 6.41 | 89 |
| 13 | $BaSrTa_4O_{12}$ | Mg | 3 | 5.34 | 56 |
| 14 | $BaSrTa_4O_{12}$ | Si | 3 | 4.08 | 53 |
| 15 | $BaSrTa_4O_{12}$ | Ca | 3 | 4.73 | 57 |

TABLE 2

| Sample | Main component | Subcomponent Element | Amount in terms of the conversion ratio of the oxide of the element [Parts by mass] | Density [g/cm³] | Relative Permittivity |
|---|---|---|---|---|---|
| 21 | $BaSrTa_4O_{12}$ | Al | 0.5 | 5.89 | 78 |
| 22 | $BaSrTa_4O_{12}$ | Al | 1 | 6.11 | 83 |
| 6 | $BaSrTa_4O_{12}$ | Al | 3 | 6.42 | 92 |
| 23 | $BaSrTa_4O_{12}$ | Al | 5 | 6.23 | 80 |
| 24 | $BaSrTa_4O_{12}$ | Al | 10 | 5.91 | 77 |

According to Table 1 and FIGS. 2-3, samples have higher density and higher relative permittivity when vanadium, titanium, or aluminum is included as the subcomponent (samples 2-4, 6-8, 10-12) than when no such element is included as the subcomponent (samples 1, 5, 9, 13-15).

According to Table 2, samples have higher density and higher relative permittivity when the amount of aluminum in terms of the conversion ratio of its oxide is 0.5-10 parts by mass (samples 6, 21-24), and still higher density and still higher relative permittivity when the amount of aluminum in terms of the conversion ratio of its oxide is 1-5 parts by mass (samples 6, 22, and 23).

The relative permittivity of each of samples 2-4, 6-8, and 10-12 is at least 60 at a temperature ranging from −70 to +180° C.

According to FIG. 4, the capacitance change of sample 6 is within ±22% of the capacitance at 25° C. under a temperature range of −55 to +150° C., thus satisfying the X8S standard. The capacitance change of sample 6 is also within ±22% of the capacitance at 25° C. under a temperature range of −70 to +180° C.

[Experiment 2]

<Samples 32, 34, 35, 42, and 43>

Dielectric compositions of samples 32, 34, 35, 42, and 43 were obtained using the same method as in Experiment 1 except that the components and the amount of the starting raw materials of the dielectric compositions were as shown below. The density and the relative permittivity of the dielectric compositions of these samples were then measured using the same method as in Experiment 1 the difference being as mentioned. Electron diffraction was performed for the dielectric compositions. The electron beam patterns were analyzed to identify the crystal system of the main component. The density, the relative permittivity, and the crystal system of the crystal of the main component of the dielectric composition of each sample are shown in Tables 3 and 4.

In Experiment 2, powders of $BaCO_3$, $SrCO_3$, and $Ta_2O_5$ were prepared as the starting raw materials of the main components of the dielectric compositions. The starting raw materials were weighed so that the composition of the main component after firing, $\{Ba_xSr_{(1-x)}\}_mTa_4O_{12}$, would have the composition shown in Tables 3 or 4.

TABLE 3

| Sample No. | Ba + Sr (m) | Ba ratio (x) | Sr ratio | Ba | Sr | Ta | Density [g/cm³] | Relative permittivity | Crystal system |
|---|---|---|---|---|---|---|---|---|---|
| 32 | 2.0 | 0.75 | 0.25 | 1.50 | 0.50 | 4 | 6.18 | 83 | Tetragonal |
| 6 | 2.0 | 0.50 | 0.50 | 1.00 | 1.00 | 4 | 6.42 | 92 | Tetragonal |
| 34 | 2.0 | 0.25 | 0.75 | 0.50 | 1.50 | 4 | 6.66 | 91 | Tetragonal |

TABLE 3-continued

| Sample No. | Ba + Sr (m) | Ba ratio (x) | Sr ratio | Ba | Sr | Ta | Density [g/cm$^3$] | Relative permittivity | Crystal system |
|---|---|---|---|---|---|---|---|---|---|
| 35 | 2.0 | 0.10 | 0.90 | 0.20 | 1.80 | 4 | 6.48 | 91 | Tetragonal |
| 10 | 2.0 | 0.00 | 1.00 | 0.00 | 2.00 | 4 | 6.46 | 90 | Orthorhombic |

Note:
The subcomponent is Al.
Note:
The amount of the subcomponent is 3 parts by mass in terms of the conversion ratio of the oxide of the element constituting the subcomponent with respect to 100 parts by mass of the entire amount of the dielectric composition.

TABLE 4

| Sample No. | Ba + Sr (m) | Ba ratio (x) | Sr ratio | Ba | Sr | Ta | Density [g/cm$^3$] | Relative permittivity | Crystal system |
|---|---|---|---|---|---|---|---|---|---|
| 42 | 1.9 | 0.25 | 0.75 | 0.48 | 1.43 | 4 | 6.12 | 83 | Tetragonal |
| 34 | 2.0 | 0.25 | 0.75 | 0.50 | 1.50 | 4 | 6.85 | 95 | Tetragonal |
| 43 | 2.1 | 0.25 | 0.75 | 0.53 | 1.58 | 4 | 6.06 | 81 | Tetragonal |

Note:
The subcomponent is Al.
Note:
The amount of the subcomponent is 3 parts by mass in terms of the conversion ratio of the oxide of the element constituting the subcomponent with respect to 100 parts by mass of the entire amount of the dielectric composition.

According to Tables 3 and 4, samples have high density and high relative permittivity when the main component of the dielectric composition of each sample is expressed by $\{Ba_xSr_{(1-x)}\}_mTa_4O_{12}$ where the value of x is 0.75 or smaller (samples 32, 6, 34, 35, 10, 42, and 43).

The relative permittivity of each of samples 32, 34, 35, 42, 43 is at least 60 at a temperature ranging from −70 to ±180° C.

DESCRIPTION OF THE REFERENCE NUMERALS

1 . . . multilayer ceramic capacitor
10 . . . element body
2 . . . dielectric layer
3 . . . internal electrode layer
4 . . . external electrode

What is claimed is:

1. A dielectric composition comprising:
a main component including tantalum, barium, and strontium; and
a subcomponent including at least one element selected from the group consisting of vanadium, titanium, and aluminum.

2. The dielectric composition according to claim 1, wherein niobium, an alkali metal, and lead are not substantially included.

3. A dielectric composition comprising:
a main component including tantalum and at least one of barium or strontium; and
a subcomponent including at least one element selected from the group consisting of vanadium, titanium, and aluminum,
wherein the total amount of vanadium, titanium, and aluminum is in a range of 0.5-10 parts by mass in terms of the conversion ratio of the oxide of each element with respect to 100 parts by mass of the entire amount of the dielectric composition, while the valence of vanadium is 5, the valence of titanium is 4, and the valence of aluminum is 3 in the conversion.

4. The dielectric composition according to claim 3, wherein the main component includes strontium.

5. A dielectric composition comprising:
a main component including tantalum, strontium and optionally barium; and
a subcomponent including at least one element selected from the group consisting of vanadium, titanium, and aluminum,
wherein the main component is expressed by $\{Ba_xSr_{(1-x)}\}_mTa_4O_{12}$, where the value of x is 0.75 or smaller, and the value of m is in a range of 1.8-2.2, inclusive of both end points.

6. The dielectric composition according to claim 5, wherein the value of x is in a range of 0.1-0.75, inclusive of both end points.

7. The dielectric composition according to claim 5, wherein the value of m is in a range of 1.9-2.1, inclusive of both end points.

8. A dielectric composition comprising:
a main component including tantalum and at least one of barium or strontium; and
a subcomponent including at least one element selected from the group consisting of vanadium, titanium, and aluminum,
wherein a crystal system of a crystal of the main component is tetragonal.

9. An electronic component comprising the dielectric composition according to claim 1.

* * * * *